Sept. 15, 1970    J. D. STOTTS, JR., ET AL    3,528,282
WELL TESTER
Filed Jan. 28, 1969
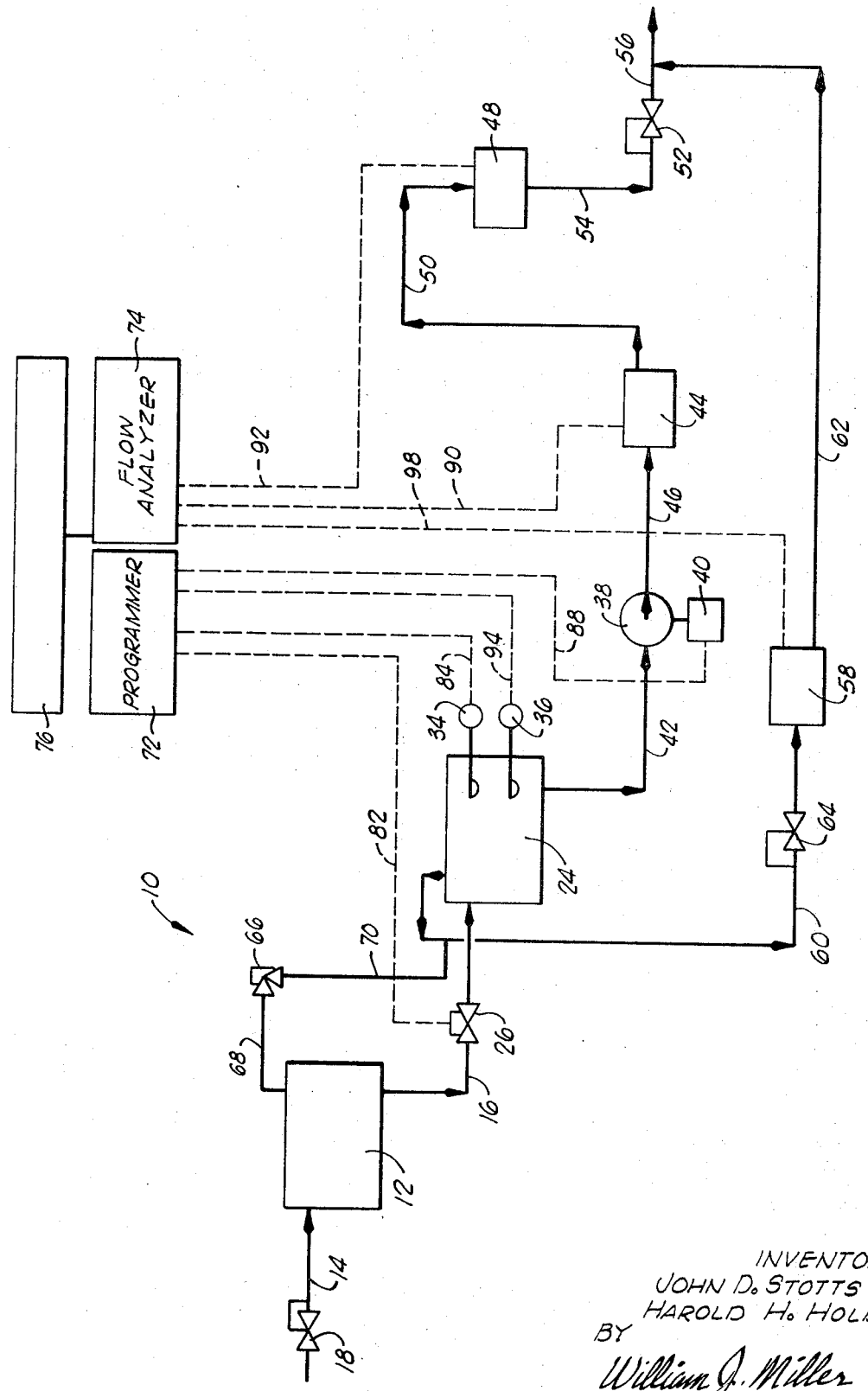
INVENTORS
JOHN D. STOTTS JR. &
HAROLD H. HOLDEN
BY
William J. Miller
ATTORNEY

United States Patent Office 3,528,282
Patented Sept. 15, 1970

3,528,282
WELL TESTER
John D. Stotts, Jr., Norman, and Harold H. Holden,
Oklahoma City, Okla., assignors to Continental Oil
Company, Ponca City, Okla., a corporation of Delaware
Filed Jan. 28, 1969, Ser. No. 794,496
Int. Cl. G01n 27/22, 33/26
U.S. Cl. 73—61.1                          11 Claims

ABSTRACT OF THE DISCLOSURE

An oil well tester, having two storage tanks, wherein the fluid flowing therethrough is retained in one of the storage tanks for a period of time, thereby allowing the constituents therein to settle out, prior to pumping the fluid through a capacitance probe. The well tester is, therefore, capable of accurately measuring the oil/water ratio in the output flow of any well, notwithstanding the fact that the percentage of water may be high, and the well tester is provided with components, sufficiently compact, with respect to size and number, that the well tester may be portable.

BACKGROUND OF INVENTION

Field of the invention

This invention relates generally to improvements in well testers provided to measure the oil/water ratio in the output flow of a well, and more particularly, but not by way of limitation, to well testers which will accurately measure the oil/water ratio in the output flow of a well where there is a high percentage (such as 50 percent) of water present in the oil.

Description of the prior art

Various systems have been devised in the past to measure the quality, or rather the oil/water ratio of the fluid being produced from a particular well, and some of these systems have included a capacitance probe. In a basic form, the capacitance probe generally comprises two plates having a potential difference applied therebetween. The fluid being analyzed passed between these two plates. It is therefore apparent that the current, which is conducted between the two plates, will vary depending on the particular dielectric constant of the fluid passing therethrough. Since difference between the dielectric constant of water and oil is sufficiently large, the current flowing between the two plates can be correlated to indicate the specific gravity of the fluid flowing therethrough, thereby indicating whether the fluid is water or oil. This information received from the capacitance probe, when used in cooperation with a flow meter, can be correlated to obtain the oil/water ratio of the fluid flowing therethrough.

If the fluid flowing through the capacitance probe comprises a mixture of oil and water and contains an appreciable percentage of water, the capacitance probe will generally indicate only the presence of water. This is due, of course, to the fact that the dielectric constant of water is extremely high. It is, therefore, apparent that the system would not measure accurately the oil/water ratio and, in fact, would indicate a much higher percentage of water in the fluid than is actually present.

One prior device attempted to alleviate this problem by agitating and circulating the fluid continuously through the capacitance probe until a constant reading was obtained from the capacitance probe. This system did give much more accurate readings in those instances where the oil/water ratio was small; however, in those systems where the oil/water ratio was large, the system would still indicate a higher percentage of water in the fluid than was actually present.

SUMMARY OF THE INVENTION

The present invention contemplates a system for measuring the oil/water ratio of a fluid containing oil and free water, comprising: tank means adapted to receive the fluid to be tested, having a discharge conduit connected thereto. A pump means and a capacitance probe are interposed in the discharge conduit. The system includes control means, which operate the pump means and the tank means, to retain the fluid in the tank means in a quiescent condition for a sufficient length of time for the free water in the fluid to substantially settle out, whereby the capacitance probe will be exposed to the water substantially separate from the remainder of the fluid.

An object of the invention is to provide a well tester capable of accurately measuring the oil/water ratio, notwithstanding the fact that the percent of water in the oil is high.

Another object of the invention is to provide a well tester which can be made portable.

A further object of the invention is to provide a well tester capable of providing a more accurate measurement of the oil/water ratio.

One further object of the invention is to provide a system for more accurately measuring the oil/water ratio when the percent of water is high.

Another object of the invention is to provide a well tester economical in construction and operation.

Other objects and advantages of the invention will be evident from the following detailed description when read in conjunction with the accompanying drawing, which illustrates the preferred embodiment of the invention.

BRIEF DESCRIPTION OF THE DRAWING

The single figure in the drawing illustrates in diagrammatical form a well tester constructed in accordance with the invention.

DESCRIPTION OF THE PREFERRED EMBODIMENT

Referring to the drawing in detail, general reference character 10 designates a well tester constructed in accordance with the invention. The well tester 10 includes a first storage tank 12 having an inlet conduit 14 and a discharge conduit 16 connected thereto. The first storage tank 12 may be constructed of any material compatible with the fluid flowing through the system, which in the system described hereinafter is generally crude oil from a production well. Due to the corrosive nature of crude oil as it comes from a well, the first storage 12, in a preferred form, may be constructed of a corrosion-resistant material such as stainless steel, or lined with an appropriate corrosion-resistant material. The methods of constructing a tank for this type of service are well known in the art and require no further explanation.

The inlet conduct 14 is adapted to be connected to the output of a well to be tested (not shown) and is provided with a self contained pressure control valve 18, positioned to sense downstream pressure. The particular setting of the control valve 18 will depend on the operating pressure of the well and on the operating pressure of the well tester. In practice the control valve 18 will be set at a pressure slightly below the pressure of the fluid to be tested, for reasons which will be made more apparent hereinafter.

The discharge conduit 16 of the first storage tank 12 is connected to an inlet opening of a second storage tank 24. The second storage tank 24 is constructed similar to the first storage tank 12 with consideration being given to the corrosive nature of crude oil normally produced from a well. The particular size of the first and second storage tanks 12 and 24 will vary, depending on the amount of fluid per unit of time which must be pumped through the well tester 10, in a given application. In sizing the first and second storage tanks 12 and 24, respectively, due consideration should also be given to the time delay cycles which occur during the operation of the well tester 10, to be described more fully hereinafter. In a typical tester each of the tanks 12 and 24 has a capacity of 300 gallons.

The second storage tank 24 is shown diagrammatically in the drawing to be oriented such that it is elongated in the vertical direction to accommodate the gas, which will separate out from the crude oil during the settling period, to be described more fully hereinfater. The first storage tank 12 could, also, be constructed in a like manner, if the particular application requires.

A solenoid valve 26 is interposed in the conduit 16 and, in a preferred form, is of the normally opened type, that is, when the solenoid valve 26 is de-energized, the valve member therein is in the open position.

A high level detector 34 is provided on one end of second storage tank 24, and is of the type which is adapted to give an electrical response when the liquid level in the second storage tank 24 reaches a predetermined high level. A low level detector 36 is also disposed on the end of second storage tank 24, and is adapted to give an electrical response when the liquid level in the second storage tank reaches a predetermined low level.

The inlet of a pump 38, which is driven by a motor 40, is connected to the discharge opening of the second storage tank 24 by a conduit 42. The pump 38 is provided to pump the fluid from the second storage tank 24 through certain measuring devices and out to the main flowline, as will be described in greater detail hereinafter. The particular size of the pump 38 and the motor 40 will depend on the size of the particular well tester 10. In a preferred form, the pump 40 is of the centrifugal type to provide a non-pulsating discharge flow and any such commercially available pump is suitable.

The discharge of the pump 38 is connected to the inlet of a flow meter 44 by a conduit 46. The flow meter 44 is adapted to measure the flow in gallons per minute, or in any other appropriate standard flow rate measurement, and to give an electrical response proportional to the fluid flow rate therethrough. The output of the meter 44 is connected to a capacitance probe 48 of the usual type employed in well testers by a conduit 50. The conduit 50 is constructed such that the portion directly preceding the capacitance probe 48 is oriented in the vertical direction. It has been found through experimentation, and is now generally recommended by the various manufacturers of capacitance probes, that the inlet to a capacitance probe should be oriented as described hereinbefore, to achieve the most accurate measurement.

The discharge opening of the capacitance probe 48 is connected to a back pressure regulator 52 by a conduit 54. The back pressure regulator 52 is connected by a conduit 56 to the main flowline. The function of the back pressure regulator 52 will be described in more detail hereinafter.

A gas meter 58 is connected to the top portion of second storage tank 24 by a conduit 60, and the discharge of the gas meter 58 is connected to the conduit 56 by a conduit 62. A detailed description of the gas meter 58 need not be included, since any gas meter which will measure the gas flowing therethrough and given an electrical response proportionate to this flow may be used in the system. A back pressure regulator 64 is disposed in the conduit 60 and is provided to maintain the gas flowing through the gas meter 58 at a relatively constant pressure.

One end of a relief valve 66 is connected to the first storage tank 12 by a conduit 68, and the opposite end thereof is connected to the conduit 60, between the second storage tank 24 and the regulator 64, by a conduit 70. The relief valve 66 is, of course, provided as a safety measure to relieve excessive pressure in the first storage tank 12, and may be of any type commercially available in the industry. The particular setting of the relief valve 66 will depend on the operating pressure of the well tester 10 and the upper pressure limits of the first storage tank 12.

A programmer 72 is provided to receive the various electrical responses from the components of the well tester 10 and thereby control the flow of fluid through the well tester 10. The particular functions and sequence of operation of the programmer 72 will be described in greater detail hereinafter. The particular combination of the components may be readily identified from the function which they are to perform. Since programmers of this type, or which may be readily adapted to perform the beforementioned functions, are readily available from such manufacturers as Continental Emsco Company of Dallas, Tex., no further description will be necessary.

A flow analyzer 74 is also provided in the well tester 10 to receive, analyze, and correlate the responses received from the flow meter 44, the capacitance probe 48 and the gas meter 58, and to compute therefrom an accurate measurement of the oil/water ratio of the fluid flowing through the well tester 10. The output signal of the flow analyzer 74 may be in the form of a digital signal and, as such, may be connected directly to a computer (not shown) to control other systems, or for further processing as the particular application may require. For example, a recorder 76 may be provided to receive the output of the flow analyzer 74 and to print out the information. The flow analyzer 74 and the recorder 76 require no further description, since any commercially available units may be used in the present invention, such as, for example, are available from the Halliburton Company of Duncan, Okla.

OPERATION OF THE PREFERRED EMBODIMENT

The well tester 10 may be successfully used to measure the oil/water ratio of the flow from a producing well, notwithstanding the fact that the percentage of water per unit volume of oil may be high (over 50%) in a particular application. When the well tester 10 is used in this type of application, the inlet conduit 14 may be connected to a main header pipeline (not shown) to obtain the sample to be tested. The outputs of a plurality of wells are also normally connected to the main header pipeline and appropriate valves and controls are incorporated therein, so that the oil output of the various producing wells may be selectively discharged into the main header pipeline. It is, therefore, apparent that the oil/water ratio of the flow from the various wells may be selectively analyzed by the well tester 10 through a single connection of the conduit 14 to the main header line. The connections and functions described hereinabove are well known in the art, and no further description is required.

When the well tester 10 is initially put into operation, the first storage tank 12 and the second storage tank 24 are empty, and the solenoid valve 26 is in the open or de-energized position. The control valve 18 is positioned to sense the pressure in the well tester 10, and more particularly in the first storage tank 12. The control valve 18 will, therefore, sense the reduced pressure in the well tester 10, and the control valve 18 will open thereby allowing the fluid to enter the well tester 10 via conduit 14. The fluid will flow into the first storage tank 12 and from the first storage tank 12 into the second storage tank 24 via conduit 16.

Since the pump 38 has not yet been started, the fluid will begin to fill the second storage tank 24. When the fluid in the second storage tank 24 reaches a predetermined high level therein, it will cause the high level controller 34 to be actuated. The electrical response of the high level controller 34 is sent to the programmer 72 through control line 84 connected therebetween. The programmer 72 will energize the solenoid valve 26 via control line 82, and will cause a time delay circuit to be activated, for reasons which will become more apparent hereinafter. Since the solenoid valve 26 is closed, no further flow can enter the second storage tank 24; thus, the first storage tank 12 will now begin to fill with fluid.

The first storage tank 12 will continue to fill with fluid, thereby increasing the pressure in the first storage tank 12. The control valve 18 will sense when a sufficient amount of fluid is present in the first storage tank, 12, or rather when the pressure in the first storage tank 12 reaches a predetermined level, and will close, thereby allowing no additional fluid to enter the first storage tank 12.

The time-delay circuit in programmer 72, which was activated upon the response of the high level controller 34, is connected to the pump motor 40 by a control line 88. The time-delay circuit is provided, such that, at the end of the particular time cycle, the motor 40 will be started, thereby starting the pump 38. The purpose of this delayed starting of the motor 40 and the pump 38, is to allow the fluid contained in the second storage tank 24 sufficient time to settle. During the settling period, the free water contained in the fluid in second storage tank 24 will separate from the oil and the oil/water emulsion which is almost always present in fluid produced from a well. This separation will occur, of course, due to the difference in the specific gravities between oil and water, and the water will settle toward the bottom of second storage tank 24. The precise settling time required will depend on the particular application, but will generally be approximately five minutes. It should be noted that the settling-time may be considerably reduced by injecting a chemical de-emulsifier into the fluid or heating the fluid while it is contained in, or flowing through, the first storage tank 12. The use of chemical de-emulsifiers for this purpose is well known in the art and requires no further description. When the time delay circuit "times out," or rather the end of this pre-set settling period, the programmer 72, via control line 88, will start the motor 40, and thereby start the pump 38.

The fluid contained in the second storage tank 24 will be pumped therefrom by the pump 38, through the conduit 46 and through the flow meter 44. The flow meter 44 will measure the flow rate therethrough and via control line 90 will send an electrical signal to the flow analyzer 74, proportional to said flow rate.

The fluid will continue to be pumped through the "looped" conduit 50 and through the capacitance probe 48. The capacitance probe 48 will send an electrical signal via control line 92 to the flow analyzer 74, said signal being proportional to the dielectric constant of the fluid flowing therethrough.

In those applications where the fluid from a producing well contains a large percentage of water per unit volume of oil (such as over 50%), and this mixture is allowed to pass through a capacitance probe, the capacitance probe generally indicates only that water is flowing therethrough. This effect is due to the fact that water has a much higher dielectric constant than oil. In the present invention, the fluid has been allowed to settle, or separate out in the second storage tank 24. It is, therefore, apparent that the initial flow from the second storage tank 24 will be essentially water, followed by the oil-water emulsion and the oil. Therefore, when the fluid is pumped from the second storage tank 24, after the settling period is completed, the initial flow of water will be measured by the flow meter 44 and indicated as water by the capacitance probe 48. The oil volume will likewise be measured by the flow meter 44 and indicated as oil by the capacitance probe 48. The present invention will, therefore, accurately indicate and measure the oil/water ratio of the fluid flowing through the well tester 10, regardless of large variations in oil/water ratio of the flow therethrough. It should also be noted that the pump 38, being positioned upstream of the capacitance probe 48, will tend to emulsify the oil and any free water which may have not settled out in the tank 24 before such water reaches the probe, thereby preventing such free water from fouling the operation of the probe.

The fluid is then pumped through the conduit 54, the back pressure regulator 52 and returned to the main flow line via conduit 56. The back pressure regulator 52 is provided to maintain the fluid flowing through the flow meter 44 and the capacitance probe 48 at a relatively constant pressure, so that more accurate measurements may be obtained.

As the fluid is pumped out of the second storage tank 24, the liquid level therein will, of course, drop. When the liquid level in the second storage tank 24 reaches a predetermined low level, the low level controller 36 is actuated. The electrical response of the low level controller 36 is sent to the programmer 72 via control line 94. The programmer 72 will then cause the motor 40 and the pump 38 to be stopped, and the solenoid valve 26 to be de-energized, or moved to the open position. The fluid contained in the first storage tank 12 will then drain into the second storage tank 24, in a manner similar to that previously described, until the high level controller 34 on the second storage tank 24 is actuated by the rising liquid level in the second storage tank 24.

The control valve 18, which is actuated by the lowering pressure in the first storage tank 12, will open, thereby allowing the fluid to flow through the pipeline 14 and begin to fill the first storage tank 12.

During the settling period of the fluid in second storage tank 24, a certain amount of gas will also separate out and tend toward the upper portion of the second storage tank 24. The gas pressure will build up in the second storage tank 24 and eventually release through the gas meter 58 via conduit 60. The gas meter 58 will accurately measure the flow of gas therethrough and will send an electrical response, proportional to the flow rate, to the flow analyzer 74 via control line 98. The gas will be returned to conduit 56 through conduit 62. The regulator 64 in conduit 60 is provided to maintain the gas going through the gas meter 58 at a relatively constant pressure, so that a more accurate flow rate measurement may be obtained. The excessive gas build-up in the first storage tank 12, which is relieved through the relief valve 66, will also be released through the gas meter 58 and be measured, in a manner similar to that described above.

The flow analyzer 74 receives the electrical responses from the flow meter 44, the capacitance probe 48, and the gas meter 58. The flow analyzer 74 will correlate and compute this data and provide the oil/water ratio of the fluid flowing through the well tester 10. This information, which is generally in a digital form, may then be fed into the recorder 76 which will translate the digital response into a "readout."

It is apparent from the foregoing that the present invention provides a well tester which will accurately measure the ratio of oil/water of the fluid flowing therethrough, notwithstanding the fact that the percentage of water may be high in a particular application. It is also apparent that the present invention utilizes a minimum number of components and may, therefore, be mounted on a mobile platform and transported to various locations.

It should be also noted that pneumatic controls and components may be substituted for the various controls and components hereinbefore described as having electrical responses. This substitution may be particularly desirable in those applications where a source of electrical energy is not readily available.

Changes may be made in the construction and arrangement of parts or elements as disclosed herein without departing from the spirit and scope of the invention as defined in the following claims.

What is claimed is:
1. The system for measuring the oil/water ratio of a fluid containing oil and free water, comprising:
   a first storage tank having an inlet and an outlet, said inlet being adapted to be connected to a source providing the fluid to be tested;
   a second storage tank having an inlet and an outlet;
   a valve connecting the outlet of the first storage tank to the inlet of the second storage tank;
   a fluid level means mounted in said second storage tank;
   an outlet line connected to the outlet of said second storage tank and including a pump connected to the line to remove the fluid from the second storage tank and a first measuring means connected to the line for measuring the dielectric constant of fluid flowing therethrough;
   second measuring means connected to the outlet of the second storage tank and the pump for measuring the flow rate of fluid flowing therethrough;
   a discharge line connected to the outlet line; and
   a control means connected to said valve, said fluid level means, and said pump to operate the system in a sequence wherein said valve will open to pass fluid to said second storage tank and will close when said fluid level means indicates said second storage tank is to the proper level, said operating sequence to retain the fluid in the second storage tank in a quiescent state a sufficient length of time for the free water in the fluid to substantially settle out prior to removal of the fluid by the pump, whereby the first and second measuring means will measure from the second tank the dielectric constant and the flow rate of the free water substantially separate from the remainder of the fluid being tested and discharge the fluid so measured to the discharge line.

2. The system of claim 1 wherein the first measuring means comprises a capacitance probe adapted to provide an electrical output signal proportional to the dielectric constant of the fluid flowing therethrough.

3. The system of claim 2 wherein the second measuring means comprises a flow meter adapted to give an electrical output signal proportional to the rate of flow of fluid therethrough.

4. The system of claim 3 characterized further to include a flow analyzer adapted to receive the electrical outputs from the capacitance probe and the flow meter, correlate such signals and compute therefrom the oil/water ratio of the fluid being tested.

5. The system of claim 4 characterized further to include a gas meter connected to the second storage tank and adapted to produce an electrical response in proportion to the flow rate of gas flowing therethrough; and means transmitting the electrical response of the gas meter to the flow analyzer.

6. The system of claim 3 characterized further to include a back pressure regulator downstream of the first and second measuring means to maintain the fluid flowing through the first and second measuring means at a relatively constant pressure.

7. The system of claim 3 wherein both of the first and second measuring means are positioned downstream of the pump.

8. The system of claim 1 characterized further to include a gas meter connected to the second storage tank and adapted to indicate the flow rate of the gas flowing therethrough.

9. The system of claim 8 wherein the gas meter is adapted to give an electrical response in proportion to the flow rate of the gas flowing therethrough.

10. The system of claim 8 characterized further to include a back pressure regulator means upstream of the gas meter to maintain the gas flowing through the gas meter at a relatively constant pressure.

11. The system of claim 1 wherein the control means includes means to control the flow of fluid into the first storage tank.

References Cited
UNITED STATES PATENTS

| | | | |
|---|---|---|---|
| 3,222,918 | 12/1965 | Kuntz et al. | 73—53 |
| 3,253,606 | 5/1966 | Kuntz | 73—61.1 X |
| 3,295,058 | 12/1966 | Graham | 324—61 |
| 3,344,659 | 10/1967 | Chambers | 73—61.1 |
| 3,003,106 | 10/1961 | Vesper et al. | 324—61 |

FOREIGN PATENTS 159,692   1/1964   U.S.S.R.

LOUIS R. PRINCE, Primary Examiner

J. W. ROSKOS, Assistant Examiner

U.S. Cl. X.R.

324—61